United States Patent [19]

Wang et al.

[11] Patent Number: 5,050,131
[45] Date of Patent: Sep. 17, 1991

[54] QUANTITATIVE METHOD FOR EVALUATING VELOCITY MODEL QUALITY

[75] Inventors: Shein S. Wang; Douglas W. Hanson; Thomas D. Cavanaugh, all of Ponca City, Okla.

[73] Assignee: Conoco Inc., Ponca City, Okla.

[21] Appl. No.: 643,387

[22] Filed: Jan. 17, 1991

[51] Int. Cl.$^5$ ............................................. G01V 1/36
[52] U.S. Cl. ................................................... 367/73
[58] Field of Search ...................... 367/50, 51, 52, 73; 364/421

[56]  References Cited
U.S. PATENT DOCUMENTS

| | | | |
|---|---|---|---|
| 4,241,429 | 12/1980 | Bloomquist et al. | 367/52 |
| 4,736,347 | 4/1988 | Goldberg et al. | 367/46 |
| 4,802,146 | 1/1989 | Moeckel | 367/52 |
| 4,813,027 | 3/1989 | Tieman | 367/52 |
| 4,953,140 | 8/1990 | Dablain | 367/73 |
| 4,982,382 | 1/1991 | Dablain | 367/73 |

Primary Examiner—Ian J. Lobo

[57] ABSTRACT

A method for quantitatively determining an accurate subsurface velocity prior to data migration includes steps whereby the accuracy of the velocity can be defined by measuring the deviation in depth as a function of offset in the common reflection point (CRP) gather. A point on reflector is selected and the CRP gather is formed. If the image is not flat, the velocity is adjusted until it is flat. The velocity is decreased and the far offset end of the image will be imaged to shallower depth than the near offset end. The velocity is increased and the image will tilt down at the far offset end. An error is defined which is the theoretical accuracy limit for the determination of velocity using the CRP method. A factor is defined that indicates the reliability of the image for a reflector.

9 Claims, 1 Drawing Sheet

QUANTITATIVE METHOD FOR EVALUATING VELOCITY MODEL QUALITY

BACKGROUND OF THE INVENTION

1. Field of the Invention

The present invention relates to methods and apparatus for evaluating velocity models and more particularly methods and apparatus for quantitatively determining the accuracy of velocity selections in converting arrival times to corresponding depths.

2. Related Prior Art

Good velocity model is the key to a successful prestack depth migration. At the present time, there is no rule of thumb by which the quality of the model can be quantitatively evaluated. Therefore, one cannot easily tell a good model from a poor model.

Migration techniques normally operate by broadcasting all recording events on a pre-stack input trace to all possible subsurface locations from which the reflection event could have originated.

When more traces are broadcasted, images begin to appear at places where broadcasted events are reinforcing each other. At places where no images are expected, the corresponding broadcasted events should cancel each other.

Prior art has disclosed many methods for processing seismic data which are used with common reflection point (CRP) gathers. Normal moveout correction is primarily used to compensate for noise or undesirable effects. As indicated previously, a significant problem with processing and migrating seismic data in the application of CRP analysis occurs when strong events occur near weak events. Examples of processing methods which include migration and normal moveout correction are as follows.

U.S. Pat. No. 4,813,027 titled "Method and Apparatus for Enhancing Seismic Data" (Hans Tieman) relates to a method and apparatus for stacking a plurality of seismic midpoint gathers to provide a pictorial representation of seismic events. The approximate propagation velocity, corresponding to a selected event in a common midpoint gather, is determined by summing the common midpoint gather using first and second weights to provide respective first and second weighted sums over an offset based on an estimated velocity corresponding to the event. A velocity error value indicative of the approximate error between the estimated velocity and the actual velocity is developed from the sums. The common midpoint gather is then restacked in accordance with the determined propagation velocity to provide an enhanced pictorial representation of the seismic event. The first and second weighted sums are taken over a time window centered upon an estimated zero offset travel time for the event. The first and second weights can be selected to provide rapid, slow or intermediate convergence upon the true velocity. The velocity error value is determined as a function of the deviation of the peak of the first weighted sum from the center of the time window, relative to the deviation of the peak of the second weighted sum from the center of the time window. Alternatively, the velocity error value is determined as a function of the deviation of the peak of the cross-correlation of the first and second weighted sums from the center of the time window.

U.S. Pat. No. 4,241,429 titled "Velocity Determination and Stacking Process from Seismic Exploration of Three Dimensional Reflection Geometry" (Marvin G. Bloomquist et al.) relates to a method for determining the dip and strike of subsurface interfaces and average propagation velocity of seismic waves. In seismic exploration, linear, multiple fold, common depth point sets of seismograms with three dimensional reflection geometry are used to determine the dip and strike of the subsurface reflecting interfaces and the average velocity of the path of the seismic energy to the reflecting interface. The reflections in each set appear with time differences on a hyperbola with trace spacings determined by the source receiver coordinate distance along the lines of exploration. The offset of the apex of this hyperbola is determined from a normal moveout velocity search of the type performed on two dimensional common depth point (CDP) sets. This search identifies the correct stacking velocity and hyperbola offset which are used to determine dip, strike and average velocity.

U.S. Pat. No. 4,802,146 titled "Method for Moveout Correction and Stacking Velocity Estimation of Offset VSP Data" (George P. Moeckel) relates to a moveout correction process and stacking velocity estimation process to permit stacking of vertical seismic profile (VSP) data. The primary reflection time is determined by using the two-way travel time, the root mean square velocity of acoustic pulses in the formation and the first arrival time of direct path acoustic pulses.

U.S. Pat. No. 4,736,347 titled "Multiple Stacking and Spatial Mapping of Seismic Data" (Bernard Goldberg et al.) relates to a method for determining the dip of subsurface formations and the apparent acoustic velocity. Seismic traces are stacked in a plurality of orthogonal measures to form multiple stacked traces at a positive offset. The stacking process determines the apparent velocities as functions of the travel time at the positive offset. The interval acoustic velocity of the first layer is then determined from knowledge of surface topography, source-receiver offset, two-way travel times and the first reflector apparent velocities. The first layer velocity information enables the incident and emergent angles of the raypaths at the surface to be calculated, as well as enabling the dip angles and spatial coordinates of the reflection points on the first reflecting boundary to be determined. Seismic data corresponding to the second reflecting boundary are then mapped spatially to the first reflecting boundary by ray tracing and by calculating the apparent velocities at the first boundary. The process is repeated for each succeedingly deeper boundary. The derived acoustic velocity model of the earth is displayed as a stacked seismic section in spatial coordinates. This process may be applied to obtain earth models and seismic sections in both two and three dimensions.

Although prior art has shown many methods for determining velocity through subsurface layers, there has been no accurate quantitative method for determining subsurface velocities.

SUMMARY OF THE INVENTION

The present invention provides a method for quantitatively determining an accurate subsurface velocity prior to data migration. The Common Reflection Point (CRP) Gather is a convenient tool for analyzing interval velocities. When the velocity is correct, the traces in the CRP gather shows a flat image on all offsets. When the velocity is poor, the images from different offsets are at different depths. The present invention provides a method whereby the accuracy of the velocity can be defined by measuring the deviation in depth as a function of offset in the CRP gather. A point on reflector is selected and the CRP gather is formed. The image should be flat. If it is not flat, the velocity is adjusted until it is flat. If the velocity is decreased, the far offset end of the image will be imaged to shallower depth than the near offset end. If the velocity is increased, the image will tilt down at the far offset end. An error is defined which is the theoretical accuracy limit for the determination of velocity using the CRP method. A factor is defined that indicates the reliability of the image for a reflector.

In an alternate embodiment, for velocity models without accompanying seismic data, a synthetic data set can be generated which contains reflections from every reflector. This synthetic data set can then be analyzed by the method outlined above.

DESCRIPTION OF THE PREFERRED EMBODIMENT

The present invention provides a method by which the accuracy of a velocity model is quantitatively determined. In the present invention, a method is proposed by which a theoretical accuracy limit can be defined for the velocity of every layer. Using this limit, the general behavior of the model under evaluation can be understood.

Let us assume that the model has N layers. The accuracy of $V_L$, which is the velocity of layer L, where $1 \leq L \leq N$, is to be evaluated. To do so, the seismic data for which this model is built must be examined.

For the purposes of this discussion, the lower boundary of layer L is referred to as reflector L. To define the accuracy of the velocity $V_L$, it is to be noted that every velocity analysis method has its own resolution limit. That is, it will not be able to tell one velocity from another if their difference is within a certain range. Therefore, this range is defined as the accuracy limit for layer L.

The Common Reflection Point (CRP) Gather is a convenient tool for analyzing interval velocities. When the velocity is correct, the traces in the CRP gather shows a flat image on all offsets. When the velocity is poor, the images from different offsets are at different depths. Thus the accuracy of the velocity can be defined by measuring the deviation in depth as a function of offset in the CRP gather as follows.

Figure 1:
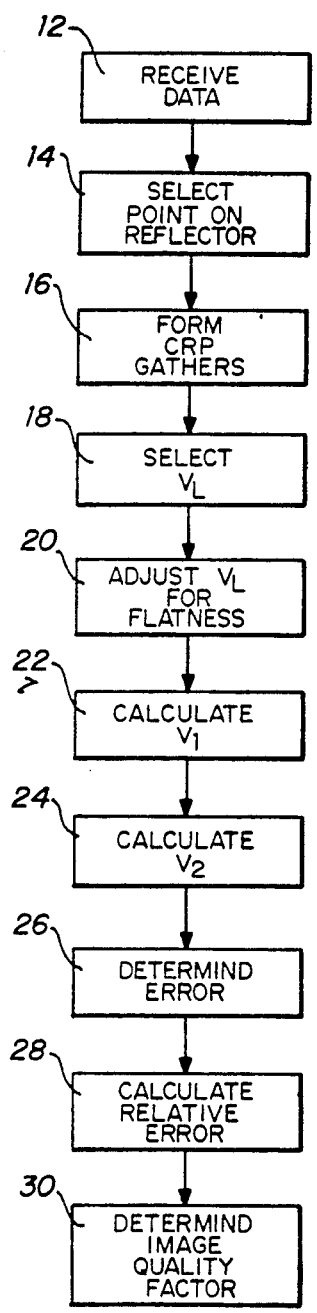
FIG. 1 is a block diagram illustrating a flow chart of the method of the present invention.
Figure 2:
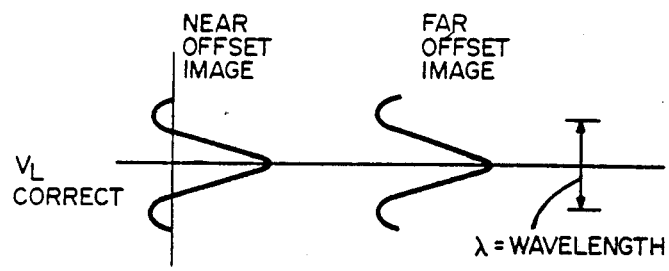
FIG. 2 is a graphical representation of two wavelets having two different offsets where the velocity model is correct.

Referring now to FIG. 1, a flow chart of the present invention is illustrated in block form. At block 12 seismic data is received. This data may take any form that is currently in use in the art. At block 14 a point on a reflector is selected. A point, for example, (x,z) on reflector L is selected. At block 16 a common reflection point gather is formed. At block 18 a velocity, $V_L$ is chosen. An image of the common reflection point gather is formed that should be flat. If it is not flat, $V_L$, the velocity, is adjusted until it is flat at block 20. FIG. 2 illustrates two wavelets with different offsets showing a flat image.

Figure 3:
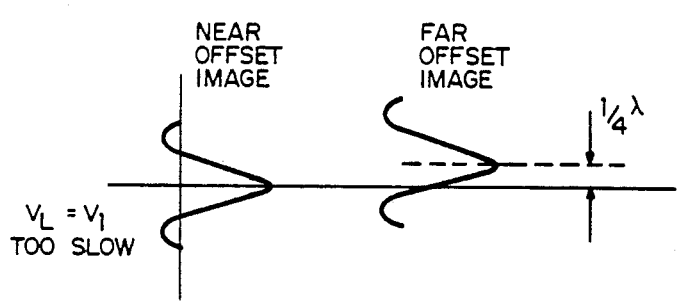
FIG. 3 is a graphical representation of two wavelets having two different offsets where the velocity model is too slow.

At block 22 $V_L$ is decreased to calculate $V_1$ and the far offset end of the image will be imaged to shallower depth than the near offset end. In other words, the image will tilt up at the far offset end. Assume $V_1$ is the velocity where the center of the far offset wavelet is ¼ wavelength shallower than the near offset wavelet. FIG. 3 illustrates two wavelets with different offsets showing an image that tilts up at the far offset end with $V_1$ as the velocity.

Figure 4:
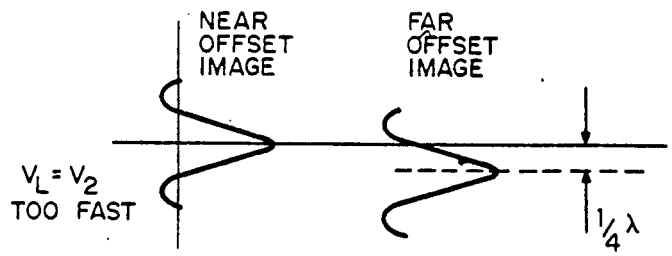
FIG. 4 is a graphical representation of two wavelets having two different offsets where the velocity model is too fast.

At block 24 $V_L$ is increased to calculate $V_2$ and the image will tilt down at the far offset end. Let $V_2$ be the velocity where the center of the far offset wavelet is ¼ wavelength deeper than the near offset wavelet. FIG. 4 illustrates two wavelets with different offsets showing an image that tilts down at the far offset end with $V_2$ as the velocity.

At block 26 the error is determined. The theoretical accuracy limit for the determination of velocity using the CRP method is defined as:

$$ERR = (V_2 - V_1)$$

At block 28, using the determined error, the relative error is calculated. The relative error is defined as:

$$RE = ERR/V_L$$

and is inversely proportional to the sensitivity of the velocity analysis.

At block 30 an Image Quality factor is determined. A factor that indicates the reliability of the image for reflector L is defined as:

$$IQ = (1 - RE)$$

An IQ near 1 indicates a very reliable image can be expected for reflector L because, with careful velocity analysis, the velocity can be accurately determined. Hence, the stacked images are accurately positioned. Low IQ values, on the other hand, indicate the velocity of the present layer is not very well defined. Accordingly, the location of the stacked image is not reliable, even though the image quality could be good.

If the plot of the velocity model is color coded using the values of either RE, IQ or ERR, or if three color plots, each colored using one factor, are supplied, these plots will provide at a glance the quality of different parts of the velocity model.

For velocity models without accompanying seismic data, i.e., synthetic models, rays can be shot and a synthetic data set which contains reflections from every reflector can be generated. This synthetic data set can then be analyzed by the method outlined above.

Thus the theoretical limit is an intrinsic property of every velocity model. It is there even when the data is noise free. It is to be noted that the preferred embodiment uses ¼ wavelength as the predetermined distance from which the far offset deviates from a center line however, this distance is selected for convenience. In practice, ⅛ or 1/10 wavelength, or any other convenient measure could be used instead.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method for quantitatively evaluating the quality of a velocity model comprising the steps of:
   receiving a seismic model having at least one reflector;
   selecting a point on said reflector;
   forming a common reflection point gather;
   choosing a first velocity;
   adjusting said first velocity to flatten said common reflection point gather;
   decreasing said first velocity to calculate a second velocity so that the center of the far offset wavelet is a predetermined distance shallower than the near offset wavelet;
   increasing said first velocity to calculate a third velocity so that the center of the far offset wavelet is said predetermined distance deeper than the near offset wavelet;
   determining an error value;
   calculating a relative error value using said error value; and
   determining an image quality factor indicating the reliability of the image for said reflector.

2. The method according to claim 1 wherein said step of determining an error value includes the step of:
   calculating said error value using the formula $$ERR = (V_2 - V_1)$$

where $V_1$ is said second velocity and $V_2$ is said third velocity.

3. The method according to claim 2 wherein said calculating a relative error value includes the step of:
   computing said relative error value using the formula $$RE = ERR/V_L$$

where $V_L$ is said first velocity.

4. The method according to claim 3 wherein said step of determining an image quality factor the reliability of the image for said reflector includes the step of:
   calculating said image quality factor using the formula $$IQ = (1 - RE).$$

5. A method for quantitatively evaluating the quality of a velocity model comprising the steps of:
   receiving a seismic model having at least one reflector;
   selecting a point on said reflector;
   forming a common reflection point gather;
   choosing a first velocity;
   adjusting said first velocity to flatten said common reflection point gather;
   decreasing said first velocity to calculate a second velocity so that the center of the far offset wavelet is a predetermined distance shallower than the near offset wavelet;
   increasing said first velocity to calculate a third velocity so that the center of the far offset wavelet is said predetermined distance deeper than the near offset wavelet;
   determining an error value by calculating said error value using the formula $$ERR = (V_2 - V_1)$$

where $V_1$ is said second velocity and $V_2$ is said third velocity;
   calculating a relative error value using said error value by computing said relative error value using the formula $$RE = ERR/V_L$$

where $V_L$ is said first velocity; and
   determining an image quality factor indicating the reliability of the image for said reflector by calculating said image quality factor using the formula $$IQ = (1 - RE).$$

6. An apparatus for quantitatively evaluating the quality of a velocity model comprising:
   means for receiving a seismic model having at least one reflector;
   means for selecting a point on said reflector;
   means for forming a common reflection point gather;
   means for choosing a first velocity;
   means for adjusting said first velocity to flatten said common reflection point gather;
   means for decreasing said first velocity to calculate a second velocity so that the center of the far offset wavelet is a predetermined distance shallower than the near offset wavelet;
   means for increasing said first velocity to calculate a third velocity so that the center of the far offset wavelet is said predetermined distance deeper than the near offset wavelet;
   means for determining an error value;
   means for calculating a relative error value using said error value; and
   means for determining an image quality factor indicating the reliability of the image for said reflector.

7. The apparatus according to claim 6 wherein said means for determining an error value includes:
   means for calculating said error value using the formula $$ERR = (V_2 - V_1)$$

where $V_1$ is said second velocity and $V_2$ is said third velocity.

8. The apparatus according to claim 7 wherein said means for calculating a relative error value includes:
   means for computing said relative error value using the formula $$RE = ERR/V_L$$

where $V_L$ is said first velocity.

9. The apparatus according to claim 8 wherein said means for determining an image quality factor the reliability of the image for said reflector includes:
   means for calculating said image quality factor using the formula $$IQ = (1 - RE).$$

* * * * *